United States Patent [19]

Nessa

[11] 4,100,833
[45] Jul. 18, 1978

[54] BLIND FASTENER

[76] Inventor: Christopher Eric Nessa, 24732 Glenwood Dr., El Toro, Calif. 92630

[21] Appl. No.: 810,175

[22] Filed: Jun. 27, 1977

[51] Int. Cl.² ............................................. F16B 35/04
[52] U.S. Cl. ....................................................... 85/3 S
[58] Field of Search ................ 85/3 S, 3 R, 3 K, 80; 151/41.75; 24/211 P, 211 R

[56] References Cited

U.S. PATENT DOCUMENTS

| 1,819,828 | 8/1931 | Tomkinson | 85/3 S |
| 2,144,895 | 1/1939 | Place | 85/3 S |
| 2,159,573 | 5/1939 | Tinnerman | 151/41.75 |
| 2,387,468 | 10/1945 | Ritzel | 151/41.75 X |
| 2,516,274 | 7/1950 | Tinnerman | 151/41.75 |
| 2,861,618 | 11/1958 | Tinnerman | 151/41.75 |
| 3,170,361 | 2/1965 | Vaughn | 85/3 R |

*Primary Examiner*—Ramon S. Britts

[57] ABSTRACT

An improved blind nut of the type sometimes referred to as an expansion bolt anchor is disclosed. It is characterized in that it is a single unitary piece of resilient material shaped to provide a thread engaging portion and having outwardly extending wings which, in normal unstressed position, have a length longer than a dimension of the wall or panel opening into which insertion is intended. The blind nut is deformed as it is inserted and the wings spread after insertion through a panel opening to prevent removal and are caused to be drawn flat against the back of the panel as the attaching bolt is threaded through the blind nut.

13 Claims, 9 Drawing Figures

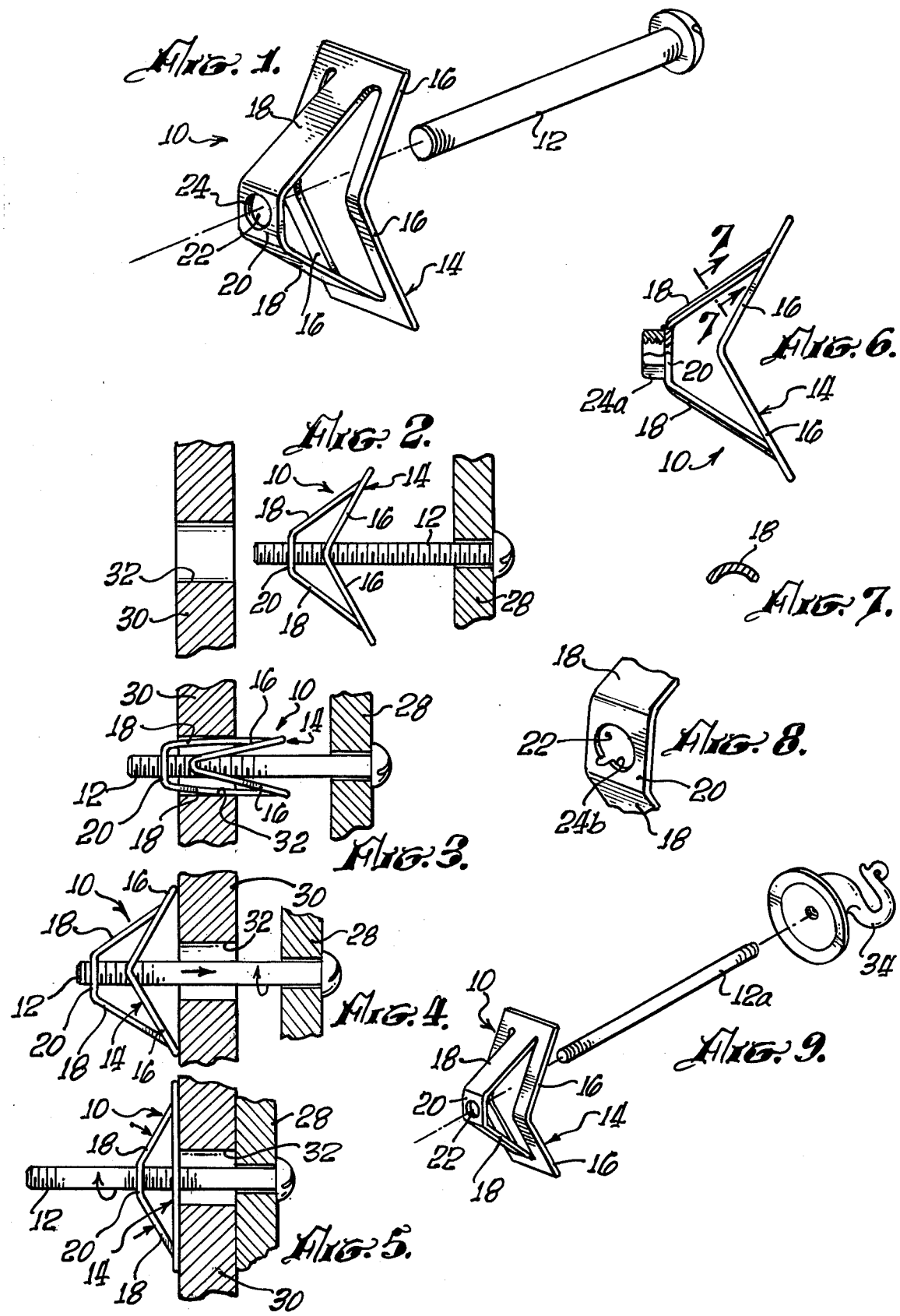

BLIND FASTENER

BACKGROUND OF THE INVENTION

1. Field of the Invention

This invention relates to fasteners and more specifically to blind fasteners or nuts, sometimes referred to as anchor bolts or toggle bolts when associated with bolts provided with threads or other types of cooperating fastening means.

2. Description of the Prior Art

Blind nut or anchor bolt assemblies are often used in the mounting of fixtures or structural elements on wall or panels in situations in which it is impossible or difficult to hold a nut on the back or "blind" side of the wall or panel. One class of blind bolt assembly is characterized in that the blind nuts used therein have threaded portions to which are connected retaining surfaces of unstressed configurations such that they may be pushed through an aperture in the wall or panel, the retaining surfaces being expanded by various means as a bolt or screw is threaded through the nut to engage and be tightened against the back of the wall or panel. In the prior art such devices have been made of unitary die stampings of metal or of molded plastic materials and are exemplified by U.S. Pat. Nos. Re. 22,543; 2,876,167; 2,762,252; 3,143,915; 3,174,387; 3,937,004; and 3,888,156. Such devices while in substantial use, are disadvantageous in that they require the inclusion of means to engage the outside of the wall or panel; that they sometimes are limited in use to a particular thickness of panel; and that they must either be of light gage material to permit the necessary deformation or require excessive force in installation.

A second type of blind nut is characterized in that it has a pair of spring biased or resilient outwardly extending wings which are attached to a threaded center portion, the wings being of a size to extend in normal unstressed condition a length greater than a dimension of the hole in the panel through which it is intended to make a connection. The wings are squeezed together as they are inserted through the prepared aperture in the panel and expand and engage the back side of the panel as a bolt or screw is threaded through the threaded center portion. The most used such device is a four piece blind nut assembly which is comprised of a threaded hinge piece which forms a pivotal connection for two wing members and a spring associated with the hinge piece and the wing members for biasing the wing members toward outwardly extending disposition. An example of a one-piece structure which seeks to duplicate the functioning of the multi-part blind nut is a unitary structure shown in U.S. Pat. No. 3,363,501 issued to H. J. Modrey on Jan. 16, 1968. The Modrey patent describes and claims a single-piece stamping of resilient metal and of a shape such that it may be formed into a threaded shank having two outwardly and upwardly extending spring fingers or wings which are adapted to be squeezed together for insertion into an opening in a panel to perform the blind nut function previously described.

There are certain disadvantages to the last described type of blind nut (deformable for insertion) as exemplified in the prior art. The multi-piece arrangement described above is subject to the disadvantages of complexity and relatively high material and labor costs involved in manufacture and assembly of the several parts. Moreover, although such devices are advantageous in that they can be used for connections to panels of varying thickness and in that they provide larger areas of contact with the inner side of the panel, they are disadvantageous in that the separate hinge piece which must be used requires an enlarged aperture in the panel to which a connection is desired to be made.

Efforts to simulate the structurally preferable multi-piece blind nut in a one-piece structure, as exemplified by the Modrey patent mentioned above, have been disadvantageous in that the metal versions have required further reshaping after the stamping of the necessary forms in order to provide an annulus for engagement with the threads of a bolt or screw. Such devices, as exemplified by the Modrey patent, are also disadvantageous in that they provide only small areas of contact with the back side of the panel which may damage the panel so that they must be used with panels of adequate minimum strength and thickness. Moreover, these small areas are at the ends of narrow arms which tend to be deformed beyond the elastic limit of the material of which they are made as the nut is tightened into position.

OBJECTS AND SUMMARY OF THE INVENTION

Thus, an object of the invention is to provide novel and improved blind fastener structures which are economical to manufacture and which provide operative advantages over the prior art.

A further object of the invention is to provide blind fastener structures which may be of single piece resilient molded plastic or stamped metal material, which have wings which are deformed to permit passage through an opening in a panel, which spread after insertion, and which provide a flat surface area to abut the back side of a panel when tightened against the panel.

Yet another object of the invention is to provide novel unitary blind fastener structures of the class described which are capable of operating functionally in the manner of multi-piece blind fastener or nut assemblies and which have the strength characteristics of such assemblies, but which require smaller apertures in the panel to which a connection is desired to be made.

Still another object of the invention is to provide novel blind fastener structures which may be used with panels of varying thickness and which provide large flat areas of contact whereby they may be safely used with thin and fragile sheet material.

The objects are realized by providing a blind fastener configuration which is readily stamped from sheet metal or molded of resilient plastic material and which provides a bolt engaging central portion attached to an outer perimeter of material of normally V-shaped configuration which forms two vertically extending wings and which may be drawn into a flat surface as it is pressed against an object such as the inner face of a panel as a bolt is inserted into the central portion of the fastener and engaged therein in normal use of the blind fastener.

The objects and the attendant advantages of the invention will become readily apparent and the invention will become better understood by reference to the following detailed description when considered in conjunction with the accompanying drawings.

BRIEF DESCRIPTION OF THE DRAWINGS

FIG. 1 is an exploded perspective view showing a blind nut according to the present invention and a cooperating threaded bolt utilized therewith.

FIGS. 2, 3, 4 and 5 are fragmentary side elevations, partially in section, illustrating various steps in the utilization of a blind nut according to the present invention.

FIG. 2 showing the blind nut and bolt assembly including the device intended to be attached to a panel or wall, prior to insertion into the panel;

FIG. 3 showing the blind nut in deformed condition as it passes through the prepared opening in the panel;

FIG. 4 showing the blind nut after it has passed through the panel and resumed its normal unstressed configuration; and FIG. 5 illustrating the blind nut in its fully installed position.

FIG. 6 is an elevation partially in section illustrating several modifications of the invention.

FIG. 7 is a cross-section taken along the line 7—7 of FIG. 6.

FIG. 8 is an enlaged fragmentary view of a variant of the invention, illustrating a thread engaging arrangement useful in some applications of the present invention.

FIG. 9 is an exploded perspective view similar to FIG. 1 illustrating another embodiment of the invention in which the bolt is provided with an enlarged head for engaging the outer surface of a panel.

DESCRIPTION OF THE PREFERRED EMBODIMENTS

Reference is made to the drawings, which illustrate several embodiments or variations of the invention. It should be realized that the novel blind fastener may be made in a variety of materials, such as plastics or metal and by known techniques for working and shaping such materials. Thus, metal materials may be formed in multiple dies or by stamping and forming to the novel configuration of this invention and plastic materials ay be molded to such configurations, all by well-known methods. Thus, the present invention relates to the novel configurations to be described herein, made of any suitable material, it being required only that the material used be resilient and of sufficient strength to perform the desired functions. Moreover, the blind fastener and cooperating bolt may be threaded or provided with any other desired known cooperating fastening means capable of effecting the necessary connection.

FIG. 1 shows a preferred embodiment of the invention comprising a blind nut 10 shown in association with a threaded bolt 12 adapted to be used to tighten the blind nut to final position in normal use. The blind nut is a single piece configuration comprising a base portion 14 which is of V-shape in longitudinal cross-section in the normal unstressed condition shown in FIG. 1 (also in FIGS. 2 and 4, as will be later described) to form a pair of outwardly extending wings 16. The base portion has a central opening and an outer frame or shell which is rectangular in shape in the exemplary configuration shown in the drawing but which may be of any shape. A central strap, integral with the base material, extends across the central opening of the base material and is attached at its ends to the material of the base at the outer ends of the wings 16, as shown. The central strap is V-shaped longitudinal cross-section to provide opposed columns 18 having angles more acute (from a straight line) than do the wings 16. The central strap is provided with a flat portion 20 having a central aperture 22 which is provided with means, as at 24, to engage the threads of a bolt or screw 12. Obviously the strap portion forming the columns 18 may be formed integral with the frame or shell of the base portion 14 or may be separately formed and attached to the base portion.

Either in the process of formation, or subsequently, the aperture 22 in central portion 20 is provided with means to engage the threads of a cooperating bolt 12. THus, if an in FIG. 1, the blind nut is formed of relatively heavy gage material the aperture 22 is provided with threads. As an alternative, as shown in FIG. 6, a nut 24 may be attached to the central portion 20, as by welding or caging. A further variant is shown in FIG. 8 for use in cases in which the material of which the blind nut is formed is sufficiently thin to engage within a thread of the cooperating bolt. In such cases a single thread may be formed by providing a slit in the periphery of the aperture 22 and bending it to form a single female thread as at 24b.

If desired, the columns 18 may be given greater compressive strength by forming them of non-planar lateral cross-section, as for example, the arcuate cross-section shown in FIGS. 6 and 7.

As previously stated, blind nuts as described herein may be stamped and/or formed of metal, in which case relatively soft steel or other heat-hardenable material is stamped out or otherwise formed to the described configuration and then heat treated to a desired degree of hardness and resilience, the requirement being only that the material be rendered suitably resilient and strong.

When the blind nut is formed of plastic materials, known molding techniques such as injection molding may be utilized to form the blind nut, it being necessary only that the material used be resilient, of sufficient strength, and have a melting point above that expected in normal usages. Some examples of suitable plastic materials are nylon, teflon, or the like.

Attention is now directed to FIGS. 2 to 5 which illustrate how a blind nut according to the present invention may be utilized to attach an article 28 to a panel 30 when there is no satisfactory access to the back wall of the panel. The article 28, to be attached to the panel 30, is provided with an aperture and the bolt 20 is inserted through that aperture, through the central opening in the base portion 14 and threaded into the threads 24, prior to insertion into a prepared opening 32 in the panel. Thus, FIG. 2 shows the assembly prior to insertion through the panel, with blind nut 14 in its normal unstressed configuration. The assembly is then inserted through the aperture 32, the columns 18 being pushed together by the panel material around the aperture 32, as shown in FIG. 3, to permit passage of the resilient blind nut structure to the back side of the panel, after which the resilient material resumes its original unstressed configuration as shown in FIG. 4. It should be obvious that after insertion of the blind nut through the aperture 32, and expansion thereof to its unstressed original configuration, the blind nut may not be withdrawn through the aperture.

The assembly is then pulled outwardly in the direction of the arrows to engage the wings 16 against the back side of the panel while the bolt 12 is rotated in a direction to thread it through the thread 24 of central portion 20, as illustrated in FIG. 4. In actual use this is often done with the fingers of the user, grasping the head of bolt 12 and pulling it outwardly while rotating it. Alternately outward pressure may be exerted on the surface 28 of the article to be attached and a screw driver used to rotated the bolt. As the distance between the bolt head and the threaded portion 24 is decreased the wings 16 are pressed against the back of the panel and, as the bolt is tightened, the wings are drawn up against said back surface so that the base portion 14 is in flat engagement with the surface to provide a maximum surface for retention of the blind nut in place, as shown in FIG. 5.

It should be noted that the final configuration, as shown in FIG. 5, provides a struture of optimum strength for its purpose, in that the base portion 14 and wings 16 are in tension, pressing against the panel with a reaction against columns 18 and threads 24 which tends to hold the head of the bolt against the attachment 28 and resist loosening. Also, the columns 18 are in compression, tending to support the material of wings 16 in position.

The foregoing description is typical of perhaps the most common usage of blind nut-bolt assemblies (sometimes designated "toggle bolts"). However, as illustrated in FIG. 9, a bolt member 12a may be comprised of a threaded shank portion having an enlarged head of size larger than the intended opening in the panel or wall and having a fitting 34, as for example a swag hook, directly attached thereto whereby such a fitting may be directly attached to a wall or panel. The fitting may either be formed integrally with the shank of the bolt or formed separately (as shown in FIG. 9) and attached to the shank as by a screw thread. Alternatively, the necessary external enlargement may be provided by a nut threaded onto the shank portion of the bolt, in which case the shank portion may be pulled in a direction opposite from the insertion direction to cause the wings 16 to engage the inner surface panel as the nut is rotated to effect the final connection.

From the foregoing it may be seen that the objects of this invention are achieved by the simple unitary configurations which provide resilient blind fastener structures in which a pair of outwardly extending wings are deformable to pass through an opening in a panel; which expand to prevent withdrawl and which are deformable when tightened against the back surface of a panel to provide a flat surface, in tension, pressed against said back surface, and columns in compression supporting said wings. The unitary blind fastener structures of the present invention simulate and are the structural equivalents of more complex and less economical multi-piece wing-type blind nuts which are common in the prior art.

As discussed herein, the novel structures may be made of a variety of materials such as heat-hardenable metals or resilient plastic materials.

Moreover, while the specific illustrated examples are of threaded blind nuts and cooperating threaded bolts, it should be understood that the cooperating male and female fastening means may take any suitable forms. Therefore, although several specific preferred embodiments have been illustrated herein, it is not intended that this invention should be limited to such examples or to any specific configurations, dimensions or materials. Rather, it is intended that the spirit and scope of the invention be as defined in the following claims.

What is claimed is:

1. A blind fastener formed of a single piece of resilient material, said blind fastener comprising a base, said base being of V-shape in longitudinal cross-section to provide a pair of wings, said base comprising an outer frame of said material and an internally disposed opening, a strap integral with said base and overlying said opening, said strap being a strip of said material connected at its opposed ends to said outer frame and extending inwardly from said wings to provide opposed columns disposed at more acute angles than said wings, a central portion integral with and connecting the adjacent outer ends of said columns, said central portion having an aperture therethrough, said aperture having means to engage the shank of a cooperating bolt.

2. A blind fastener according to claim 1, said material being resilient plastic material.

3. A blind fastener according to claim 1, said material being resilient sheet metal.

4. A blind fastener according to claim 3, wherein said resilient metal is heat hardenable metal, formed in a relatively soft state and heat hardened to a state of resilience.

5. A blind fastener according to claim 4 wherein said metal is malleable steel, heat hardened to a state of resilience.

6. A blind fastener according to claim 1 wherein said means to engage the threads of a matching bolt comprises at least one screw thread.

7. A blind fastener according to claim 6 wherein said at least one screw thread is formed in the material of said central portion defining said aperture.

8. A blind fastener according to claim 7 wherein said screw thread is defined by a slit in the sheet material at the periphery of the aperture, the material being bent to form a single turn of female screw thread.

9. A blind fastener according to claim 6 wherein said means to engage the shank of a matching bolt comprises a nut welded to the material of said central portion.

10. A fastener according to claim 1 wherein said base is of rectangular configuration, said outer frame of sheet material comprising long and short sides of said rectangular configuration, said strap being attached to said short sides.

11. A blind fastener according to claim 1 wherein said columns are of non-planar lateral cross-section to provide increased strength in compression.

12. A blind nut attachment assembly comprising a blind nut and a threaded member having a threaded shank portion and an enlarged head, said blind nut being formed of a single piece of resilient sheet material and comprising a base formed of said sheet material, said base being of V-shape in longitudinal cross-section to provide a pair of wings, said base comprising an outer frame of said sheet material and an internally disposed opening, a strap integral with said base and overlying said opening and connected at its opposed ends to said outer frame and extending inwardly from said wings to provide opposed columns disposed at more acute angles than said wings, a flat central portion integral with and connecting the adjacent outer ends of said columns, said central portion having an aperture therethrough, said aperture having means to engage the threads of said threaded shank portion, the free end of said threaded shank portion being adapted to extend through a prepared bore in an article intended to be attached to a wall or panel and to be engaged in the thread engaging means of the said central portion, whereby when said blind nut is pushed through an aperture in a panel of lesser dimension than that of said wings, the said wings are resiliently pressed together to pass through said aperture and are adapted to expand to their normal unstressed configuration after passing through said aperture to prevent withdrawal, and whereby the said wings may be drawn up flat against the rear side of said panel as said threaded shank portion is threaded through said central portion and the enlarged head portion of said threaded member presses said article tightly against the wall or panel.

13. A blind nut attachment assembly comprising a blind nut and a threaded member having a threaded shank portion and an enlarged head, said enlarged head being of dimension larger than the opening in the wall or panel to which attachment is desired to be made and having a fitting attached thereto at its outer end, said blind nut being formed of a single piece of resilient sheet material and comprising a base formed of said sheet material, said base being of V-shape in longitudinal cross-section to provide a pair of wings, said base comprising an outer frame of said sheet material and an internally disposed opening, a strap integral with said base and overlying said opening and connected at its opposed ends to said outer frame and extending inwardly from said wings to provide opposed columns disposed at more acute angles than said wings, a flat central portion integral with and connecting the adjacent outer ends of said columns, said central portion having an aperture therethrough, said aperture having means to engage the threads of said threaded shank portion, the free end of said threaded shank portion being adapted to be engaged in the thread-engaging means of the said central portion, whereby when said blind nut is pushed through an aperture in a panel of lesser dimension than that of said wings, the said wings are resiliently pressed together to pass through said aperture and are adapted to expand to their normal unstressed configuration after passing through said aperture to prevent withdrawal, and whereby the said wings may be drawn up flat against the rear side of said panel as said threaded shank portion is threaded through said central portion and the enlarged head portion of said threaded member is pressed against said wall or panel to effect secure placement of said fitting on the exterior of said wall or panel.

* * * * *